O. A. KNOPP.
ELECTRICAL MEASURING APPARATUS.
APPLICATION FILED JAN. 11, 1912.
1,141,642.
Patented June 1, 1915.
2 SHEETS—SHEET 1.
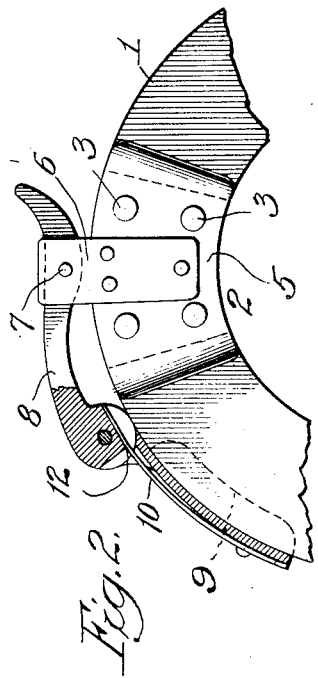
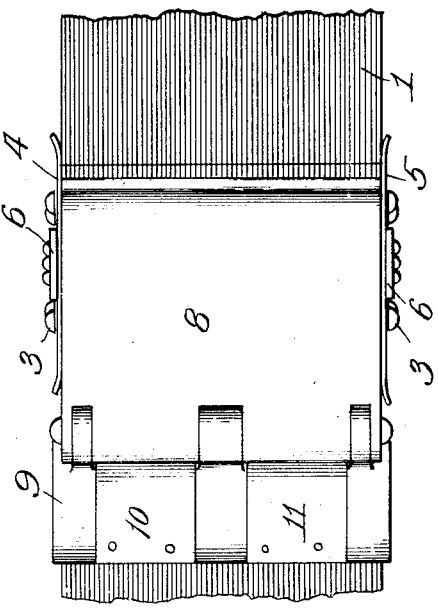
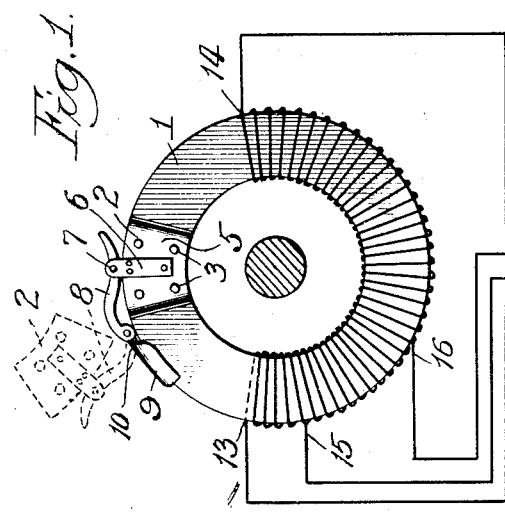
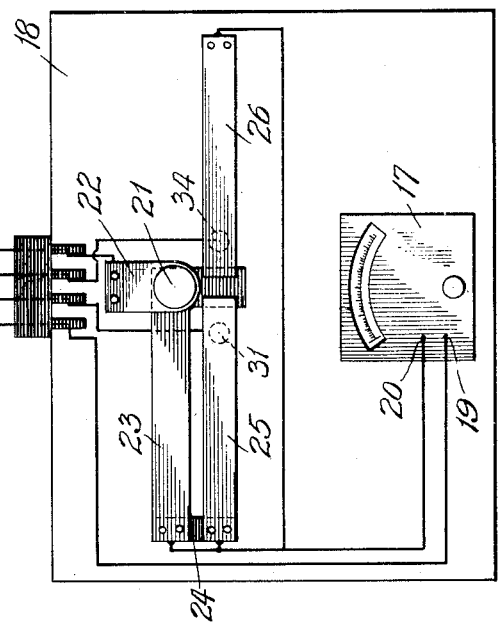
Witnesses:
John Enders
J. V. Curran.
Inventor:
Otto A. Knopp,
by Arba B. Marvin
Atty O. A. KNOPP.
ELECTRICAL MEASURING APPARATUS.
APPLICATION FILED JAN. 11, 1912.
1,141,642.
Patented June 1, 1915.
2 SHEETS—SHEET 2.
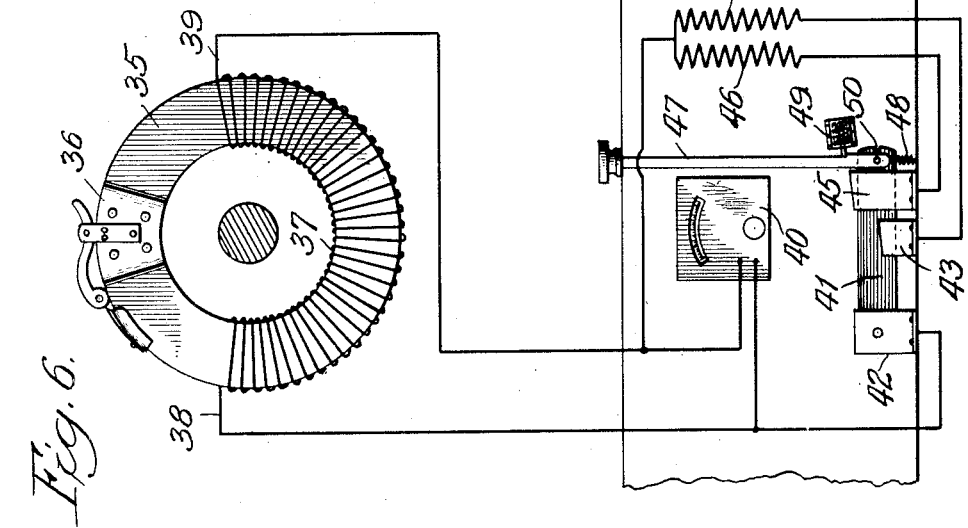
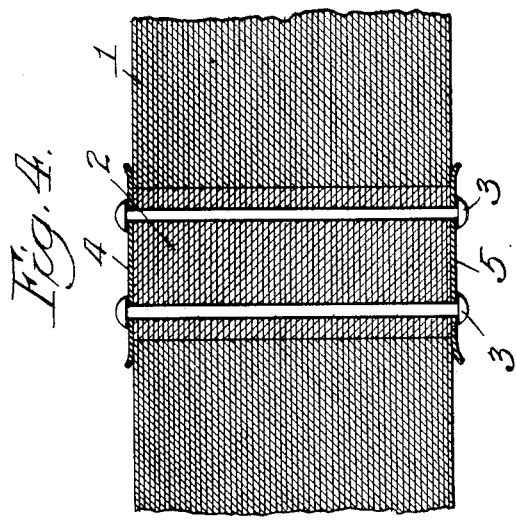
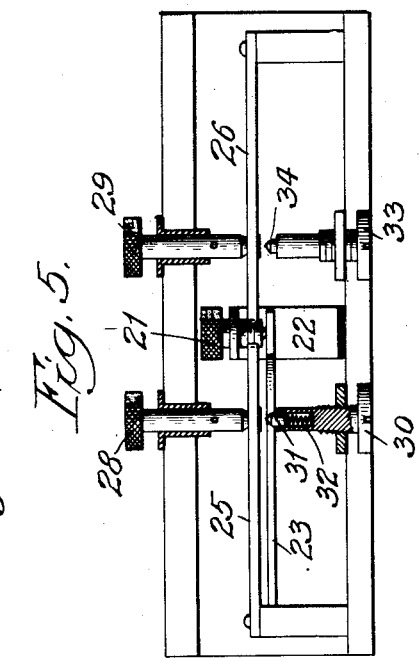
Witnesses:
John Enders
J. V. Curran.
Inventor:
Otto A. Knopp,
by Arba B. Marvin
Atty.

UNITED STATES PATENT OFFICE.

OTTO ALBRECHT KNOPP, OF OAKLAND, CALIFORNIA, ASSIGNOR TO PACIFIC GAS & ELECTRIC COMPANY, OF SAN FRANCISCO, CALIFORNIA, A CORPORATION OF CALIFORNIA.

ELECTRICAL MEASURING APPARATUS.

1,141,642.        Specification of Letters Patent.      Patented June 1, 1915.

Application filed January 11, 1912. Serial No. 670,600.

*To all whom it may concern:*

Be it known that I, OTTO A. KNOPP, a subject of the Emperor of Germany, having declared my intention of becoming a citizen of the United States, residing at Oakland, in the county of Alameda, State of California, have invented new and useful Improvements in Electrical Measuring Apparatus, of which the following is a specification.

It is the object of the present invention to provide a measuring apparatus or testing device, whereby the quantity of current flowing through an alternating current conductor may be determined in accurate and ready manner. To this end, the apparatus here disclosed comprises a magnetizable core, so constructed that it may be slipped over a straight wire or cable. The core carries a winding, so that when it is in place inclosing a conductor, the apparatus, together with the conductor, will constitute a current transformer, having a primary of a single turn. The winding carried by the core is connected with a suitable indicating instrument whereon the indications show the quantity of current passing through the conductor or cable under test. In the constructions hereinafter described in detail, suitable means are provided for giving to the apparatus a wide range of action and the several parts are so related that accuracy of reading may be had, not only for high currents in the cable, but also for low currents therein.

The details of my invention will be better understood by reference to the following detailed description taken in conjunction with the accompanying drawing, wherein—

Figure 1 is a diagrammatic representation of the core and its winding, together with the indicating instrument and the interposed switches and other adjuncts; Fig. 2 is a side elevation of the removable wedge portion of the core; Fig. 3 is a plan view of the same; Fig. 4 is a sectional plane through the wedge; Fig. 5 is an elevation of the switch mechanism illustrated in Fig. 1; Fig. 6 illustrates a modification wherein the range of the indicating instrument is controlled in a manner somewhat different from that of Fig. 1.

The system illustrated diagrammatically by Fig. 1 comprises a portable inductive device or transformer which can be opened up to slip over a conductor to be tested and a current indicating device or ammeter with certain adjuncts or elements interposed between these two parts to vary or control the magnitude of the indications on the ammeter.

The inductive device or transformer comprises a laminated iron core 1 of circular outline, but cut away at one edge to provide a wedge-shaped opening so that the core can be slipped over a conductor or cable, the current of which is to be determined. This wedge-shaped opening is equipped with a wedge-shaped block 2 built up of laminations held in place by suitable bolts or rivets 3 and side or cheek plates 4 and 5. This wedge-shaped block carries a pair of ears 6 connected by a transverse bar 7 whereby the wedge is pivotally mounted on a lever 8 pinned to a saddle 9 carried by the main body of the core. This lever 8 can be swung outward to withdraw the wedge-shaped block from its opening and is equipped with a pair of leaf springs 10 and 11 which act on a corner 12 of the lever to hold the lever open after it has once been opened, or to hold it tightly closed with the wedge pressed down firmly into its socket.

It will be understood that the magnetic reluctance of the transformer circuit is in a large measure dependent on the accuracy with which this wedge 2 fits in its socket.

By constructing the apparatus as above described, the apparatus as a whole may be made sensitive enough for the measurement of currents which otherwise would be too small to come within the accurate range of the ammeter.

The magnetic core 1 carries a continuous winding, wound between the points 13 and 14 and having a plurality of taps 15 and 16 located at suitable points between the extremities of the winding.

The indicating instrument or ammeter 17 of the apparatus may be mounted on a suitable base 18, as indicated diagrammatically in Fig. 1 and has one of its terminals 19 connected directly with terminal 13 of the transformer winding or secondary. The other terminal 20 of the indicating instrument may be connected with the secondary terminal 14 or with either of the taps 15 and 16 through a manually operated control mechanism, which is indicated somewhat diagrammatically in Fig. 1 and which will now be described.

The control mechanism comprises a central terminal 21, screw threaded in a standard or bracket 22 and movable downward into contact with the upper face of a flat, flexible L-shaped plate 23 mounted at one end on a block 24. This plate constitutes a switch mechanism whereby terminal 20 of the indicating instrument may be connected through the contact or terminal 21 with the transformer winding at 14. But the control mechanism also includes two other plates or switch members, numbered respectively 25 and 26, and disposed one on either side of contact 21 and somewhat in advance thereof. Each of these plates 25 and 26 has its outer end rigidly mounted and its inner end free to move downward into contact with the top face of the short arm of the L-shaped member 23, with the result that when either plate 25 or 26 is depressed, it may be forced down far enough to push plate 23 out of engagement with contact 21, thereby interrupting the flow of current through terminal 14.

The downward movement of plate 25 may be effected manually by means of a push button or plunger 28 (Fig. 5) and similarly plate or switch member 26 may be depressed by a push button 29. Immediately under plate 25 and in position to make contact therewith when the latter is depressed, is a terminal 30 having a contact point 31 yieldingly mounted on a coiled spring 32. When plate 25 is pushed downward by the operator, it first completes the circuit at contact 31 and then strikes plate 23, ultimately moving that plate out of contact with terminal 21, thereby shifting the effective circuit for the indicating instrument from terminal 14 of the transformer winding to terminal 15. This shifting of connections changes the number of transformer turns effective for sending current through the indicating instrument.

Switch member 26 is provided with a terminal 33 tipped with a yielding contact 34, these devices being operative to shift connections at the will of the operator from terminal 14 of the transformer winding to terminal 16 thereof, thereby giving to the transformer an effective winding intermediate between the total number of turns on the core and that small portion thereof which is embraced between terminals 13 and 15.

To take a reading of amperage in a conductor or cable under test, the wedge-shaped block is withdrawn, the core is slipped over the conductor or cable and the wedge is snapped back tightly into its socket. This effectively closes the gap and affords a closed path for the magnetic lines induced in the core by the current in the cable under test. The operator can then adjust the control device by such manipulation of the push buttons 28 and 29 as will yield in the ammeter 17 an indication of suitable magnitude for easy reading. With keys 28 and 29 both in raised position, the apparatus will be in adjustment for its highest range. Then, if key 29 be depressed, it establishes connection with tap 16 and almost instantly thereafter opens the connection to terminal 14 of the winding, thereby shifting the apparatus to its intermediate range. A similar downward movement of push button 28 can be used to shift connections to tap 15, at which the apparatus is on its lowest range. This flexibility in control makes the apparatus useful over a wide range of currents, even down to current values as low as 10 to 20 amperes, and permits the reading of a wide range of cable currents, all with a single outfit and all with equal accuracy.

The modified apparatus shown in Fig. 6 comprises a core 35 and spring-pressed wedge 36, like those of Fig. 1, but the secondary winding 37 is not provided with taps, but is continuous from its end 38 to its end 39. The indicating instrument or ammeter 40 is permanently connected to the terminals of the transformer secondary, but is shunted by a control apparatus indicated digrammatically in Fig. 6.

The control apparatus comprises a movable switch 41, the pivotal base 42 of which is permanently connected with terminal 38 of the transformer secondary. This switch is provided with contact blades 43 connected through a relatively low resistance 44 to the terminal 39 of the transformer. A second pair of contact blades 45 also embraces the movable end of the switch, these being somewhat higher than blades 43 and therefore adapted for maintaining contact with the switch blade 41 after the current through contacts 43 has been interrupted by upward movement of the switch. The contact blades 45 are connected through a relatively large resistance 46 to terminal 39 of the transformer secondary. Upward movement of the switch 41 may be effected by means of a bar 47 pivoted to the end of blade 41 and manually operated. A coiled spring 48 is located under the movable end of blade 41 and normally holds the switch in closed position. However, a strong upward pull on the rod 47 will raise blade 41 until the circuit through contacts 43 is interrupted. A spring catch 49 is in position for engagement with a notch 50 in the end of the switch blade to retain that blade in this intermediate position, even though the coiled spring 48 exerts a downward pull thereon. A further upward pull on handle 47 will lift the switch blade out of circuit with the contacts 45, leaving the ammeter 40 directly connected across the transformer secondary and no longer shunted by the resistances 44 and 46. There is no latch for holding the switch open and spring 48 is so adjusted that if the operator releases the switch blade, it will slam back past the catch 49 into the closed position shown in Fig. 6.

To take a reading of current in a cable about which the transformer core has been adjusted, the operator starts with the switch in the position shown in Fig. 6, and if the indication on the ammeter is not of sufficient magnitude, the operator pulls on rod 47, thereby cutting out one of the shunting resistances and increasing the current flow in the indicating instrument. This is the intermediate range of the apparatus. A still further opening of the switch will throw resistance 46 out of circuit and will set the apparatus in adjustment for a relatively high instrument reading with low current in the cable under test. Then on release of the switch it snaps back through the action of spring 48 into its initial position on high scale. In this modification, as in that of Fig. 1, a wide range of measurement is possible and the magnetic circuit is so complete that currents of relatively low value may be measured with ease and accuracy.

What I claim as new and desire to secure by Letters Patent is:

1. A portable measuring set for alternating current mains, comprising a magnetizable core having an opening in its side adapting it to slip over the main to envelop the same, said core carrying a continuous winding arranged in sections, an indicating instrument for connection with said winding to receive current therefrom, and a plurality of switch blades each electrically connected with said indicating instrument and means for connecting said blades to different points along said sectional winding to vary the range of the apparatus in accordance with the magnitude of the current flowing in said main.

2. A measuring apparatus for an alternating current conductor, said apparatus having a core with an opening in its side and adapted to slip over the conductor into inductive relation therewith with the main positioned centrally with respect to the core, said core carrying a continuous winding closely encircling the side of the core opposite said opening, said winding being arranged in sections, an indicating instrument connected with said winding, and a plurality of manually operative switch blades electrically connected to said instrument, and means for connecting said blades one after another to different points along said winding to vary the indicating range of the apparatus in accordance with the magnitude of the current carried by said conductor, said variations in range being effected by varying the number of active turns in said winding and one of said blades being affected by movement of any of the others.

3. In a measuring apparatus, the combination of a ring shaped magnetizable core having two parts hinged together and adapted for opening up to receive at the center of the ring a conductor under measurement, a winding encircling one side of said core and arranged in sections, an indicating instrument arranged for connection with different points along said winding, and a plurality of manually operative spring blades electrically connected to said indicating instrument and operative to vary the quantity of current delivered from said winding to said indicating instrument, by shifting the point of connection with said winding one of said blades being moved out of contact when any of the others are depressed to shift connections.

4. In a measuring apparatus, the combination of a magnetizable core in two parts and carrying a winding, said core being adapted to open and slip over and symmetrically encircle a straight conductor to form a current transformer, an indicating instrument connected to receive current from the winding of said transformer, and three spring blades permanently connected with said indicating instrument one of said blades being normally in connection with an outer end of said winding and the other blades being movable into connection with intermediate points of said winding for quickly varying the number of transformer turns effective for sending current through said indicating instrument, said first-named blade projecting below the other blades and being movable thereby when either of them is depressed.

5. A portable cable-testing apparatus, comprising a magnetizable core of circular outline carrying a winding having two portions adapted for opening to symmetrically inclose a straight conductor, thereby forming a current transformer, an indicating instrument connected directly to one terminal of said winding, and switching means for shifting the connection for the other terminal of said instrument to different points along said winding while the instrument circuit remains closed in accordance with the magnitude of the current flowing in the conductor which is enveloped by the magnetizable core, said switch means comprising three spring blades permanently connected with one terminal of said instrument, one of said blades being normally in connection with an outer terminal of the winding on said core, said last-named blade having an extension projecting under the ends of the other blades, said other blades being each movable downward to establish connection with an intermediate point on said winding, this downward movement being effective to open the connection with the outer terminal by movement of the blade normally connected therewith.

6. A magnetizable core for cable-testing current-transformers, said core being ring shaped and having a wedge-shaped sectoral opening for the admission of the conductor under test into the center of the core, and a wedge-shaped closure hinged to the periphery of said core, and fitting tightly in said opening to insure a good magnetic circuit symmetrically encircling the conductor under test.

7. A current transformer for cable-testing, comprising a magnetizable core of circular outline and carrying a winding, said core having a wedge-shaped opening for the admission into its center of a conductor under test and a wedge-shaped closure for said opening fitted tightly thereto and held in place under spring pressure to insure symmetrical distribution of magnetic material about the conductor under test.

In witness whereof, I hereunto subscribe my name to this specification in the presence of two witnesses.

OTTO ALBRECHT KNOPP.

Witnesses:
W. G. SCHMIDT,
GEO. WAGNER.